(12) United States Patent
Bach

(10) Patent No.: US 6,617,026 B2
(45) Date of Patent: Sep. 9, 2003

(54) PARTICLES CONTAINING ACTIVE IN VISCO-ELASTIC LIQUIDS

(75) Inventor: Poul Bach, Birkerød (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 09/966,948

(22) Filed: Sep. 28, 2001

(65) Prior Publication Data

US 2002/0110620 A1 Aug. 15, 2002

Related U.S. Application Data

(60) Provisional application No. 60/239,211, filed on Oct. 10, 2000.

(30) Foreign Application Priority Data

Oct. 2, 2000 (DK) ........................................ 2000 01459

(51) Int. Cl.$^7$ ................................................. B32B 5/16
(52) U.S. Cl. ................... 428/402; 428/403; 428/402.2; 428/407; 427/212; 427/213; 427/213.31
(58) Field of Search ................................ 428/402, 403, 428/402.2, 407; 427/212, 213, 213.31

(56) References Cited

FOREIGN PATENT DOCUMENTS

| WO | 92/20329 | | 11/1992 |
|---|---|---|---|
| WO | 97/24178 | | 7/1997 |
| WO | 00/10700 | * | 3/2000 |
| WO | 00/21504 | | 4/2000 |
| WO | 01/25323 | | 4/2001 |

* cited by examiner

*Primary Examiner*—Leszek Kiliman
(74) *Attorney, Agent, or Firm*—Elias Lambiris; Jason Garbell

(57) ABSTRACT

The present invention relates to a particle comprising an active dispersed in a visco-elastic liquid matrix having a $\eta'$ and a $\eta''$ between $10^3$ to $10^{14}$ Pa measured in a cone-and-plate rheometer at 25° C. and a sinusoidal frequencies $\omega$ of 1 Hz.

20 Claims, No Drawings

PARTICLES CONTAINING ACTIVE IN VISCO-ELASTIC LIQUIDS

CROSS-REFERENCE TO RELATED APPLICATIONS

This application claims under 35 U.S.C. 119, priority or the benefit of a Danish application No. PA 2000 01459 filed Oct. 2, 2001, and U.S. provisional application No. 60/239,211 filed Oct. 10, 2000, the contents of which are fully incorporated herein by reference.

FIELD OF THE INVENTION

The present invention relates to particles comprising an active comprised in a liquid visco-elastic liquid matrix. The invention also relates to processes for the manufacture of such particles and to compositions and the use of such particles in a number of applications.

BACKGROUND OF THE INVENTION

It is known to the art to incorporate actives such as enzyme into dry solid particles and thereby protect the active from inactivation and/or protect the environment form the active. Such products have usually been applied to other dry products such as dry granular detergents compositions to improve their performance. Such particles containing an active are prepared by applying the active to a mixture of solids. Among actives, which suitably may be incorporated in dry solid particles are enzymes.

Known enzyme granule formulation technologies include:

a) Spray dried products, wherein a liquid enzyme-containing solution is atomised in a spray drying tower to form small droplets which during their way down the drying tower dry to form an enzyme-containing particulate material. Very small particles can be produced this way (Michael S. Showell (editor); *Powdered detergents;* Surfactant Science Series; 1998; vol. 71; page 140–142; Marcel Dekker).

b) Layered products, wherein the enzyme is coated as a layer around a pre-formed inert core particle, wherein an enzyme-containing solution is atomised, typically in a fluid bed apparatus wherein the pre-formed core particles are fluidised, and the enzyme-containing solution adheres to the core particles and dries up to leave a layer of dry enzyme on the surface of the core particle. Particles of a desired size can be obtained this way if a useful core particle of the desired size can be found. This type of product is described in e.g. WO 97/23606.

c) Absorbed core particles, wherein rather than coating the enzyme as a layer around the core, the enzyme is absorbed onto and/or into the surface of the core. Such a process is described in WO 97/39116.

d) Extrusion or pelletized products, wherein an enzyme-containing paste is pressed to pellets or under pressure is extruded through a small opening and cut into particles which are subsequently dried. Such particles usually have a considerable size because of the material in which the extrusion opening is made (usually a plate with bore holes) sets a limit on the allowable pressure drop over the extrusion opening. Also, very high extrusion pressures when using a small opening increase heat generation in the enzyme paste, which is harmful to the enzyme. (Michael S. Showell (editor); *Powdered detergents;* Surfactant Science Series; 1998; vol. 71; page 140–142; Marcel Dekker).

e) Prilled products, wherein an enzyme powder is suspended in molten wax and the suspension is sprayed, e.g. through a rotating disk atomiser, into a cooling chamber where the droplets quickly solidify (Michael S. Showell (editor); *Powdered detergents;* Surfactant Science Series; 1998; vol. 71; page 140–142; Marcel Dekker). The product obtained is one wherein the enzyme is uniformly distributed throughout an inert material instead of being concentrated on its surface. Also U.S. Pat. Nos. 4,016,040 and 4,713,245 are documents relating to this technique.

f) Mixer granulation products, wherein an enzyme-containing liquid is added to a dry powder composition of conventional granulating components. The liquid and the powder in a suitable proportion are mixed and as the moisture of the liquid is absorbed in the dry powder, the components of the dry powder will start to adhere and agglomerate and particles will build up, forming granulates comprising the enzyme. Such a process is described in U.S. Pat. No. 4,106,991 (NOVO NORDISK) and related documents EP 170360 B1 (NOVO NORDISK), EP 304332 B1 (NOVO NORDISK), EP 304331 (NOVO NORDISK), WO 90/09440 (NOVO NORDISK) and WO 90/09428 (NOVO NORDISK). In a particular product of this process wherein various high-shear mixers can be used as granulators, granulates consisting of the enzyme, fillers and binders etc. are mixed with cellulose fibers to reinforce the particles to give the so-called T-granulate. Reinforced particles, being more robust, release less enzymatic dust (vide infra).

Known enzyme formulations are to day either "dry formulations", i.e. consisting of agglomerates of solid particles or "liquid formulations", i.e. liquids containing solutions or suspensions of enzymes/enzyme particles.

WO 00/10700 disclose a method for producing particle-shaped immobilizates of a substrate in a supporting material, according to which the substrate and supporting material form a moderately to highly viscous and possibly viscoelastic mixture and the structure of the immobilizates is fixed in a liquid medium only after preparation of the mixture of supporting material and substrate.

WO 00/21504 disclose encapsulation of sensitive liquid components into a matrix to obtain discrete shelf-stable particles.

WO 01/25323 disclose elastic articles comprising a polymeric matrix and an active.

SUMMARY OF THE INVENTION

One object of the present invention is to provide new and safer ways to use and handle active substances, such as enzymes. For actives it is generally desired to separate them from their surroundings until the moment when they are to be used in an application. This has generally been achieved by incorporating the active in discrete particles. Incorporation of the active in a particle also serves the purpose of lowering the amount of potentially harmful active dust, which may be generated from the active. The present invention relates to such improved particles and provide a particle comprising an active dispersed in a visco-elastic liquid matrix, wherein the visco-elastic parameters η' and η" are between $10^3$ to $10^{14}$ Pa measured in a cone-and-plate rheometer at 25° C. and a sinusoidal frequency, ω, of 1 Hz.

The invention also provides methods for preparation of the particles and compositions comprising the particles.

DETAILED DESCRIPTION OF THE INVENTION

When handling dry solid compositions comprising an active, one of the major problems is the formation of dust from the active, which may be harmful to persons handling the dry solid composition. This problem does usually not occur when an active is present in a liquid composition because the surrounding liquid effectively suppresses dust formation. However, for other properties, such as stability of the active, dry solid compositions are usually far superior to liquid compositions because an active may more effectively be separated from other ingredients and dry compositions does not usually provide a medium in which the active may be degraded.

Although the active may be incorporated in dry solid particles as known to the art, which may inhibit the formation of active dust it is a fact that active dust may still be released from the particles, e.g. as measured by the known Heubach Method.

We have found that is possible to prepare liquid particles incorporating an active, wherein the particles, although being liquid, at certain conditions may be processed and prepared as solid particle. The reason why the proposed particles have a very low dust release is that a liquid never or rarely develop dust as long as the liquid does not atomise, which will be impossible due to the extreme high viscosities and the visco-elastic properties. It is contemplated that the viscosity needs to be below 100–500 mPa to be atomised, whereas the visco-elastic liquid matrix of the present invention have viscosities above $10^3$ Pa.

The particle of the invention has in particular a shell core configuration, wherein the core is a particle comprising an active dispersed in a liquid visco-elastic matrix having a $\eta'$ and a $\eta''$ between $10^3$ to $10^{14}$ Pa at 25° C. and the coating is any coating material.

Definitions

The term "solid" as used in the context of this invention is to be understood as a property of a material. A solid material is defined as a material for which a certain amount of stress, i.e. force pr. unit area is obtained, when applying a deformation force, i.e. a strain to the solid material. This stress may be time dependent, but it will always attain a steady, non-zero steady state value.

The term "liquid" as used in the context of this invention is to be understood as a property of a material. A liquid material is defined as a material for which a certain amount of stress, i.e. force pr. unit area is obtained, when a deformation force, i.e. a strain is applied to the liquid material, as long as deformation occurs. As soon as deformation stops the stress level decreases immediately to the steady state level, which always will be exactly zero. Liquids are incapable of sustaining or maintaining an internal permanent stress in the liquid.

The term "visco-elastic liquid" as used in the context of this invention is to be understood as a property of the liquid. A liquid (fluid) is visco-elastic, when the time span for the stress in the material to reach exactly zero after a deformation is sufficiently large. Visco-elastic liquids may be described using a simple model containing two parameters $\eta'(\omega)$ and $\eta''(\omega)$, which may easily be measured in a cone-and-plate rheometer (eg. Bohlin Rheometer) for different sinusoidal frequencies $\omega$. $\eta'(\omega)$ may be interpreted as the elasticity of the visco-elastic fluid and $\eta''(\omega)$ as the viscosity. The tangent of ratio $\delta=\eta'(\omega)/\eta''(\omega)$, measured in degrees is called the loss tangent=tan $\delta$. This definition is acknowledged in the art e.g. in Bird R. B., Armstrong R. C., Hassager O. "Dynamics of polymeric liquids", Volume 1: Fluid mechanics, John Wiley and Sons, Chapter 6, especially example 6.1.2.1 pp 281, 1977. Visco-elastic liquids of the invention has a $\eta'$ and a $\eta''$ between $10^3$ to $10^{14}$ Pa when measured in a cone-and-plate rheometer (eg. Bohlin Rheometer) using a sinusoidal frequencies $\omega$ of 1 Hz at 25°. The ratio $\delta$ (delta) is also called the phase angle, which is sometimes called $\phi$ (phi). The phase angle $\phi$ is 0° for a pure elastic solid and 90° for a pure viscous liquid.

The visco-elastic liquids used in present invention may be materials containing no or at least very little water. Water may be bound to the components of the liquid or it may contain water absorbed from a humid environment. The amount of water in the liquid will therefore depend on the components of the liquid, the hygroscopicity of the components and the humidity of the surrounding environment. The visco-elastic liquids used in the present invention may contain below 30% w/w water, particularly below 20% w/w water, particularly 10% w/w water, particularly below 5% w/w water, more particularly below 3% w/w, more particularly below 1% w/w or no detectable amount of water.

The term "true density" of a compound as used herein, is to be construed as the density in weight per volume of said compound, determined by immersing a weighed amount of the compound in a liquid in which the compound is insoluble and measuring the volume increase of liquid dispersion (i.e. the volume of liquid which is displaced by the compound). As an example, if 1 gram of a compound is added to a volume of 10 $cm^3$ of a liquid in which the compound is insoluble and by said addition the volume of the liquid-compound mixture increases to 11 $cm^3$, the compound thereby displacing 1 $cm^3$ of liquid, the true density of the compound is 1 gram per $cm^3$. The true density of a liquid may be measured as the weight of a measured volume of the liquid.

The term "wax" as used herein, is to be construed as a compound having a melting point between 25–150° C.

The term "visco-elastic liquid matrix" as used herein, is to be construed as a visco-elastic liquid phase, wherein actives and optionally other useful components are dispersed, and wherein the visco-elastic liquid is used for tying and/or binding the other components together to form a liquid discrete and particulate entity. In an uncoated particle, the visco-elastic liquid constituting the visco-elastic liquid matrix constitutes at least 35% w/w, particularly at least 45% w/w, more particularly at least 50% w/w, more particularly at least 60% w/w more particularly at least 70% w/w, more particularly at least 80% w/w of the particle in which the active and other useful components are distributed.

The term "dispersed" as used herein concerning actives being dispersed in a visco-elastic liquid matrix is to be understood as the active being evenly or homogeneously present throughout the visco-elastic liquid matrix e.g. as active dissolved in the visco-elastic liquid matrix and/or as discrete solid or liquid clusters or particles or droplets of active homogeneously distributed in the visco-elastic liquid matrix.

The phrase "ratio between the diameter of the coated particle and the diameter of the core particle" (hereinafter abbreviated $D_T/D_C$) as used herein is to be understood as the diameter of the particle comprising a core particle and a coating divided by the diameter of the core particle only. If for example a core particle having a diameter of 100 $\mu$m is coated with a coating layer 200 $\mu$m thick, the coated particle would have a diameter of (200+100+200)=500 $\mu$m and $D_T/D_C$ is 500 $\mu$m/100 $\mu$m=5.

The term "substantially enzyme free " as used herein about a coating means that there less than 5 mg of enzyme per gram coating.

The Particle

The particles of the invention comprises an active dispersed or suspended in a visco-elastic liquid matrix having a η' and a η" both between $10^3$ to $10^{14}$ Pa measured in a cone-and-plate rheometer at 25° C. and a sinusoidal frequencies ω of 1 Hz. Having the active embedded in a visco-elastic liquid matrix lowers the amount of active, which may be released from the particle as dust, because of the liquid properties. However, due to the visco-elastic properties of the matrix it is still possible to prepare particles form the liquid matrix as though it was a solid as long as the preparation is done faster than the time span the visco-elastic liquid needs to reach the steady state level of exactly zero stress.

The long term structural integrity of the particle of the invention is in particular improved by applying one or more coating layers around the particle, so that the particle of the invention constitutes a core particle surrounded by coating (s). In particular, at least one of the coating layers is a dry solid coating, which may provide additional structural strength to the particle and aid in preserving the shape of the particle over time.

In general such coated particles have a preferred average size (as measured in the longest dimension of the particles) between 50–1200 μm, more particularly between 100–600 μm. For some application, low size particles are in particular such as between 50–200 μm, whereas in other application larger sizes are in particular such as 300–600 μm.

The core particle itself should in particular be less than 700 μm or 600 μm, particularly between 50 and 500 μm, such as between 100 and 400 μm, most particularly between 200 and 300 μm.

In one embodiment the coating is relatively thick, as compared to conventional coatings, to provide increased structural properties to the coated particle. Accordingly, the $D_T/D_C$ of the coated particle should be at least 1.1, particularly at least 1.5, more particularly at least 2, more particularly at least 2.5, more particularly at least 3, most particularly at least 4. $D_T/D_C$ is however is in particular below about 100, particularly below about 50, more particularly below 25, and most particularly below 10. In particular a range for $D_G/D_C$ is about 4 to about 6.

In general such coated particles have in particular a true density below 3 g/cm$^3$, particularly below 2 g/cm$^3$, more particularly below 1.5 g/cm$^3$.

Liquid Visco-elastic Matrix

The visco-elastic liquid making up the matrix wherein the active and optionally other useful components may in principle be any liquid material or mixtures of liquid materials which meets the requirements for viscosity and elasticity at ambient conditions set for the liquid visco-elastic particles of the invention.

In particular materials may be organic visco-elastic materials such as liquid materials comprising, consisting of or containing organic polymers and/or monomers. Materials such as carbohydrate polymers (e.g. pectins), proteins (e.g.) gelatin, sugars, glucose syrups, modified vegetable oils or mixtures thereof can be brought or formulated into a liquid state having visco-elastic properties as required in the present invention.

Particularly a majority of the components constituting the visco-elastic liquid matrix are water soluble.

In one embodiment the visco-elastic parameters η' and a η" of the visco-elastic liquid matrix are between $10^8$ to $10^{12}$ Pa, particularly between $10^9$ to $10^{11}$ when measured in a cone-and-plate rheometer at 25° C. and a sinusoidal frequency, ω, of 1 Hz. In another embodiment the visco-elastic parameters η' and a η" of the visco-elastic liquid matrix are particularly between $10^4$ to $10^{11}$ Pa when measured in a cone-and-plate rheometer at 25° C. and a sinusoidal frequency, ω, of 1 Hz.

Actives

The active of the invention may any active component or mixture of active components, which benefits from being separated from the surrounding environment. The term "active" is meant to encompass all components, which upon release from the visco-elastic liquid matrix upon applying the particle of the invention in a process serves a purpose of improving the process. Suitable actives are those, which are either subject of deactivation and/or causing deactivation to other components in the compositions of the invention. As said the active is particularly present dispersed or suspended as discrete solid particles in the visco-elastic liquid matrix.

The active may be inorganic of nature such as bleach components as mentioned infra or organic. In particular actives are active biological materials, which are usually very sensitive to the surrounding environment and benefits from being embedded in a visco-elastic liquid matrix, such as materials obtainable from microorganisms. In particular actives are peptides or polypeptides such as enzymes.

The enzyme in the context of the present invention may be any enzyme or combination of different enzymes. Accordingly, when reference is made to "an enzyme" this will in general be understood to include combinations of one or more enzymes.

It is to be understood that enzyme variants (produced, for example, by recombinant techniques) are included within the meaning of the term "enzyme". Examples of such enzyme variants are disclosed, e.g., in EP 251,446 (Genencor), WO 91/00345 (Novo Nordisk), EP 525,610 (Solvay) and WO 94/02618 (Gist-Brocades NV).

The enzyme classification employed in the present specification with claims is in accordance with *Recommendations* (1992) *of the Nomenclature Committee of the International Union of Biochemistry and Molecular Biology,* Academic Press, Inc., 1992.

Accordingly the types of enzymes which may appropriately be incorporated in granules of the invention include oxidoreductases (EC 1.-.-.-), transferases (EC 2.-.-.-), hydrolases (EC 3.-.-.-), lyases (EC 4.-.-.-), isomerases (EC 5.-.-.-) and ligases (EC 6.-.-.-).

In particular oxidoreductases in the context of the invention are peroxidases (EC 1.11.1), laccases (EC 1.10.3.2) and glucose oxidases (EC 1.1.3.4)]. An Example of a commercially available oxidoreductase (EC 1.-.-.-) is Gluzyme™ (enzyme available from Novo Nordisk A/S). Further oxidoreductases are available from other suppliers. In particular transferases are transferases in any of the following subclasses:

a) Transferases transferring one-carbon groups (EC 2.1);

b) Transferases transferring aldehyde or ketone residues (EC 2.2); acyltransferases (EC 2.3);

c) glycosyltransferases (EC 2.4);

d) transferases transferring alkyl or aryl groups, other than methyl groups (EC 2.5); and e) transferases transferring nitrogeneous groups (EC 2.6).

A particular type of transferase in the context of the invention is a transglutaminase (protein-glutamine γ-glutamyltransferase; EC 2.3.2.13).

Further examples of suitable transglutaminases are described in WO 96/06931 (Novo Nordisk A/S).

In particular hydrolases in the context of the invention are: Carboxylic ester hydrolases (EC 3.1.1.-) such as lipases (EC 3.1.1.3); phytases (EC 3.1.3.-), e.g. 3-phytases (EC 3.1.3.8) and 6-phytases (EC 3.1.3.26); glycosidases (EC 3.2, which fall within a group denoted herein as "carbohydrases"), such as α-amylases (EC 3.2.1.1); peptidases (EC 3.4, also known as proteases); and other carbonyl hydrolases].

In the present context, the term "carbohydrase" is used to denote not only enzymes capable of breaking down carbohydrate chains (e.g. starches or cellulose) of especially five- and six-membered ring structures (i.e. glycosidases, EC 3.2), but also enzymes capable of isomerizing carbohydrates, e.g. six-membered ring structures such as D-glucose to five-membered ring structures such as D-fructose.

Carbohydrases of relevance include the following (EC numbers in parentheses): α-amylases (EC 3.2.1.1), β-amylases (EC 3.2.1.2), glucan 1,4-α-glucosidases (EC 3.2.1.3), endo-1,4-beta-glucanase (cellulases, EC 3.2.1.4), endo-1,3(4)-β-glucanases (EC 3.2.1.6), endo-1,4-β-xylanases (EC 3.2.1.8), dextranases (EC 3.2.1.11), chitinases (EC 3.2.1.14), polygalacturonases (EC 3.2.1.15), lysozymes (EC 3.2.1.17), β-glucosidases (EC 3.2.1.21), α-galactosidases (EC 3.2.1.22), β-galactosidases (EC 3.2.1.23), amylo-1,6-glucosidases (EC 3.2.1.33), xylan 1,4-β-xylosidases (EC 3.2.1.37), glucan endo-1,3-β-D-glucosidases (EC 3.2.1.39), α-dextrin endo-1,6-α-glucosidases (EC3.2.1.41), sucrose α-glucosidases (EC 3.2.1.48), glucan endo-1,3-α-glucosidases (EC 3.2.1.59), glucan 1,4-β-glucosidases (EC 3.2.1.74), glucan endo-1,6-β-glucosidases (EC 3.2.1.75), arabinan endo-1,5-α-L-arabinosidases (EC 3.2.1.99), lactases (EC 3.2.1.108), chitosanases (EC 3.2.1.132) and xylose isomerases (EC 5.3.1.5).

Examples of commercially available proteases (peptidases) include KANNASE™, EVERLASE™, ESPERASE™, ALCALASE™, NEUTRASE™, DURAZYM™, SAVINASE™, PYRASE™, PANCREATIC TRYPSIN NOVO (PTN), BIO-FEED™ PRO and CLEAR-LENS™ PRO (all available from Novo Nordisk A/S, Bagsvaerd, Denmark).

Other commercially available proteases include MAXATASE™, MAXACAL™, MAXAPEM™, OPTI-CLEAN™ and PURAFECT™ (available from Genencor International Inc. or Gist-Brocades).

Examples of commercially available lipases include LIPOPRIME™ LIPOLASE™, LIPOLASE™ ULTRA, LIPOZYME™, PALATASE™, NOVOZYM™ 435 and LECITASE™ (all available from Novo Nordisk A/S).

Other commercially available lipases include LUMAFAST™ (*Pseudomonas mendocina* lipase from Genencor International Inc.); LIPOMAX™ (*Ps. pseudoalcaligenes* lipase from Gist-Brocades/Genencor Int. Inc.; and Bacillus sp. lipase from Solvay enzymes. Further lipases are available from other suppliers.

Examples of commercially available carbohydrases include ALPHA-GAL™, BIO-FEED™ ALPHA, BIO-FEED™ BETA, BIO-FEED™ PLUS, BIO-FEED™ PLUS, NOVOZYME™ 188, CELLUCLAST™, CELLUSOFT™, CEREMYL™, CITROZYM™, DENIMAX™, DEZYME™, DEXTROZYME™, FINIZYM™, FUNGAMYL™, GAMANASE™, GLUCANEX™, LACTOZYM™, MALTOGENASE™, PENTOPAN™, PECTINEX™, PROMOZYME™, PULPZYME™, NOVAMYL™, TERMAMYL™, AMG™ (AMYLOGLUCOSIDASE NOVO), MALTOGENASE™, SWEETZYME™ and AQUAZYM™ (all available from Novo Nordisk A/S). Further carbohydrases are available from other suppliers.

The amount of active, such as enzyme (calculated as pure enzyme protein) in a core particle of the invention will typically be in the range of from about 20% to 65% by weight of the core particle, particularly no less than 25%, such as no less than 30%, 35%, 40%, 45%, 50%, 55%, 60% or 65% by weight.

Other Materials

The core particle can comprise other materials in addition to the visco-elastic liquid matrix and the active(s), which may serve a specialised function in the core particle. Other materials may be compounds conventionally used in the art, and may be selected from the non limiting group of:

Enzyme stabilising agents. Enzyme stabilising or protective agents such as conventionally used in the field of enzyme formulation may be elements of the core particle. Stabilizing or protective agents may fall into several categories: alkaline or neutral materials, reducing agents, antioxidants and/or salts of first transition series metal ions. Each of these may be used in conjunction with other protective agents of the same or different categories. Examples of alkaline protective agents are alkali metal silicates, carbonates or bicarbonates, which provide a chemical scavenging effect by actively neutralising e.g. oxidants. Examples of reducing protective agents are salts of sulfite, thiosulfite, thiosulfate or $MnSO_4$ while examples of antioxidants are methionine, butylated hydroxytoluene (BHT) or butylated hydroxyanisol (BHA). In particular agents are salts of thiosulfates, e.g. sodium thiosulfate or methionine. Also enzyme stabilizers may be borates, borax, formates, di- and tricarboxylic acids and reversible enzyme inhibitors such as organic compounds with sulfhydryl groups or alkylated or arylated boric acids. Examples of boron based stabilizer may be found in WO 96/21716, whereas a particular boron based stabilizer is 4-Formyl-Phenyl-Boronic Acid or derivatives thereof described in WO 96/41859 both disclosures incorporated herein by reference. Still other examples of useful enzyme stabilizers are gelatine, casein, Polyvinyl pyrrolidone (PVP) and powder of skimmed milk. Enzyme stabilising agents may constitute 0.01–10% w/w of the core particle, particularly 0.1–5%, e.g. 0.5–2.5% w/w of the core particle.

Solubilising agents. The solubility of the core particle is especially critical in cases where the core particle is a component of detergent formulation. As is known by the person skilled in the art, many agents, through a variety of methods, serve to increase the solubility of formulations, and typical agents known to the art can be found in national *Pharmacopeia's*. Thus, the core particle may optionally comprise any agent that serves to enhance the solubility of the core particle.

Inorganics, such as water soluble and/or insoluble inorganic salts such as finely ground alkali sulphate, alkali carbonate and/or alkali chloride, clays such as kaolin (e.g. SPESWHITE™, English China Clay), bentonites, talcs, zeolites, calcium carbonate, and/or silicates.

Binders, e.g. binders with a high melting point or indeterminately high melting points and of a non-waxy nature, e.g. polyvinyl pyrrolidone, dextrins, polyvinylalcohol, cellulose derivatives, for example hydroxypropyl cellulose, methyl cellulose or CMC. A suitable binder is a carbohydrate binder such as Glucidex 21D™ available from Roquette Freres, France.

Waxes, such as organic compounds having a melting temperature of 25–150° C., particularly 35–80° C. Suitable waxes includes Polyethylene glycols; polypropylenes or polyethylenes or mixtures thereof; Nonionic surfactants; Waxes from natural sources such as Carnauba wax, Candelilla wax, bees wax, hydrogenated plant oil or animal tallow; fatty acid alcohols; mono-glycerider and/or di-glycerider; fatty acids and paraffines.

Fiber materials such as pure or impure cellulose in fibrous form. This can be sawdust, pure fibrous cellulose, cotton, or other forms of pure or impure fibrous cellulose. Also, filter aids based on fibrous cellulose can be used. Several brands of cellulose in fibrous form are on the market, e.g. CEPO™ and ARBOCELL™. Pertinent examples of fibrous cellulose filter aids are is Arbocel BFC200™ and Arbocel BC200™. Also synthetic fibers may be used as described in EP 304331 B1 and typical fibers may be made of polyethylene, polypropylene, polyester, especially nylon, polyvinylformate, poly(meth)acrylic compounds.

Cross-linking agents such as enzyme-compatible surfactants, e.g. ethoxylated alcohols, especially ones with 10 to 80 ethoxy groups. These may both be found in the coating and in the core particle.

Suspension agents, mediators (for boosting bleach action upon dissolution of the particle in e.g. a washing application) and/or solvents may be incorporated in the core particle.

Viscosity regulating agents. Viscosity regulating agents may be present in the core particle.

Coatings

As described, supra, the particles of the invention are particularly coated particles, in which the coating improves the properties of the particles. The coating material may be any conventional coating material, particularly materials which are soluble or dispersible in water. Conventional coatings are described e.g. in WO 89/08694, WO 89/08695, EP 270608 B1 and/or WO 00/01793. Other examples of conventional coating materials may be found in U.S. Pat. No. 4,106,991, EP 170360, EP 304332, EP 304331, EP 458849, EP 458845, WO 97/39116, WO 92/12645A, WO 89/08695, WO 89/08694, WO 87/07292, WO 91/06638, WO 92/13030, WO 93/07260, WO 93/07263, WO 96/38527, WO 96/16151, WO 97/23606, U.S. Pat. Nos. 5,324,649, 4,689,297, EP 206417, EP 193829, DE 4344215, DE 4322229 A, DD 263790, JP 61162185 A and/or JP 58179492.

The coating may comprise materials selected from binders, fibers, salts, water insoluble minerals, pigments, enzyme stabilizers, waxes or combinations thereof as described, supra, in the section of "other materials".

In a particular embodiment the coating may comprise minor amounts of a protective agent, as described supra in the section "other materials", capable of reacting with a component capable of inactivating (being hostile to) the active entering the particle or granule from a surrounding matrix, i.e. before the component come into contact and inactivate the active. The protective agent may thus e.g. be capable of neutralizing, reducing or otherwise reacting with the component rendering it harmless or less reactive with the active. Typical components capable of inactivating the actives are oxidants such as perborates, percarbonates, organic peracids and the like.

The amounts of protective agent in the coating may be 5–40% w/w of the coating, particularly 5–30%, e.g. 10–20%. The fact that these components interacts with reactive components from the surrounding environment means that these components protecting the active from oxidation may also serve a purpose when released in an application of the particles of the invention. These components, when released, may also modify the action of reactive components or reactive systems, such as bleach systems of the surrounding environment, and thus serve e.g. as inhibitors to oxidation and/or corrosion processes. As an example the protective agents may serve silver corrosion inhibitors.

The coating should encapsulate the core particle by forming a continuous homogenous layer.

The coating may perform any of a number of functions in the particle or granule, depending on the intended use. Thus, for example, a coating may achieve one or more of the following effects:

(i) further reduction of the dust-formation tendency of a core particle;

(ii) further protection of active(s) in the core particle against oxidation by bleaching substances/systems (e.g. perborates, percarbonates, organic peracids and the like);

(iii) dissolution at a desired rate upon introduction of the particle into a liquid medium (such as an aqueous medium);

(iv) provide a better physical strength of the particle of the invention.

The coating may further comprise one or more of the following: Chlorine scavengers, plasticizers, pigments, lubricants (such as surfactants or antistatic agents) and fragrances.

Plasticizers useful in coating layers in the context of the present invention include, for example: polyols such as sugars, sugar alcohols, or polyethylene glycols (PEGs) having a molecular weight less than 1000; urea, phthalate esters such as dibutyl or dimethyl phthalate; and water.

Suitable pigments include, but are not limited to, finely divided whiteners, such as titanium dioxide or kaolin, colored pigments, water soluble colorants, as well as combinations of one or more pigments and water soluble colorants.

As used in the present context, the term "lubricant" refers to any agent, which reduces surface friction, lubricates the surface of the granule, decreases tendency to build-up of static electricity, and/or reduces friability of the granules. Lubricants can also play a related role in improving the coating process, by reducing the tackiness of binders in the coating. Thus, lubricants can serve as anti-agglomeration agents and wetting agents.

Examples of suitable lubricants are lower polyethylene glycols (PEGs) and ethoxylated fatty alcohols.

In one embodiment of the invention the core particle of the invention is coated with a protective coating having a high constant humidity such as described in the Danish patent application WO 00/01793 pages 5–9 and given examples, which is hereby incorporated by reference.

In a further embodiment the coating is substantially free of active. The term "substantially enzyme free" as used herein about a coating means that there less than 5 mg of active per gram coating.

In a still further embodiment the coating is thicker than known coatings in that $D_T/D_C$ is at least 1.1, particularly at least 1.5, more particularly at least 2, more particularly at least 2.5, more particularly at least 3, most particularly at least 4. $D_T/D_C$ is however particularly below about 100, particularly below about 50, more particularly below 25, and most particularly below 10. A particularly range for $D_G/D_C$ is about 4 to about 6.

The thickness of the coating may be at least 25 $\mu$m. A particular thickness is at least 50 $\mu$m such as at least 75 $\mu$m, at least 100 $\mu$m, least 150 $\mu$m, least 200 $\mu$m, least 250 $\mu$m or particularly at least 300 $\mu$m.

In embodiments aimed primarily at using the particles of the invention in detergent formulations, different "functional" components could be added to the coating such as TAED, CMC, bleach, OBA, surfactants, perfume as well as other functional components used in detergent formulations known to the person skilled in the art. The coating may also optionally comprise functional components selected for their specific use in the foodstuffs industry, baking industry, additives industry, feed industry, detergent industry or other industries where particles of actives can be used.

As previously stated the coating should in consequence of the thickness and the choice of materials provide physical and mechanical strength to the liquid core particle so as to maintain the shape of the liquid core particle during storage and processing.

The coating will also protect the liquid core particle when compositions containing particles of the invention is processed, such as steam pelletizing of feeds. The high temperatures and humidity used in the steam process can, under certain conditions dissolve the core particle and/or denature the active thus reducing or destroying the activity. The coating may comprise components that confer thermal-resistance to the coating or whose overall composition gives a coating that will melt at a temperature at which the active in the core particle is still fully stable. This will allow the temperature within the immediate environment of the active to rise no higher than the melting point of the coating for a certain period of time (the time in question is also dependent on the thickness of the coating). Accordingly a coating suitable for protecting an active in the core particle during a (steam) pelletizing process should have a melting temperature or temperature range within 70–120° C.

The coating, in certain embodiments, can comprise several coating layers, each with a special function.

In one embodiment the coating has an outer layer of a liquid lubricant. The purpose of the lubricant is to grease the granule so as to increase flow ability of the granule and to further inhibit dust formation when individual granules collide during handling. The lubricant is particularly a mineral oil or a nonionic surfactant, and more particularly the lubricant is not miscible with the other shell materials.

In one embodiment the coating is elastic and comprises a gas phase component. The gas phase component should particularly constitute at least 20% by volume of the coating material and the coating material should particularly have a true density below 0.8 g/cm$^3$. Suitable gases include atmospheric air, carbon dioxide, nitrogen, noble gases.

Further the gas phase component may suitably be incorporated in the coating in the form of light spheres comprising the gas phase.

Light spheres are small particles with low true density. Typically, they are hollow spherical particles with air or gas inside. Such material is usually prepared by expanding a solid material. These light spheres may be inorganic of nature such as SCOTCHLITE™ Glass Bubbles from 3M™ (hollow glass spheres), Q-CEL® (hollow microspheres of borosilicate glass) and/or Extendospheres® (ceramic hollow spheres) available from The PQ Corporation. The light spheres may also be of organic nature such as the PM-series (plastic hollow spheres) available from The PQ Corporation. Expancel® (hollow plastic spheres) from AKZO Nobel, Luxsil® and Spherical® from Potters Industries and/or Styrocell$^R$ from SHELL, which is spheres of polystyrene. The polystyrene of Styrocell$^R$ contains pentane which upon heating boils and expands or pops the material (the reaction is comparable to the expansion of corn seeds into popcorn) leaving a light polystyrene material of a low true density. Also polysaccharides are in particular, such as starch or derivatives thereof. Biodac® is an example of non-hollow light weight material made from cellulose (waste from papermaking), available from GranTek Inc. These materials may be included in the granules of the invention either alone or as a mixture of different light materials.

The coating may further comprise materials selected from waxes, polypeptides, and carbohydrate polymers. A particular wax is a polyethylene glycol, in particular polypeptides are selected from gelatine, collagen, casein, chitosan, polyaspartic acid and polyglutamic acid, while particular carbohydrate polymers are selected from pectin, starch, modified starch, cellulose, modified cellulose, carrageenan, gum Arabic, acacia gum, xanthan gum, locust bean gum and guar gum.

Method of Preparing Particles

A special feature of the visco-elastic liquids is that they may be processed as solids under the correct conditions. This enables preparation of core particles using mechanical processing, as roller presses, extruders, film-forming machines etc.

Methods for preparing the visco-elastic liquid particles of the invention should always contain the step of dispersing the active and optionally other materials, particularly in a solid particulate form, in a visco-elastic liquid matrix to a particularly homogenous dispersion. This step could suitably be conducted at elevated temperatures to gain a lower viscosity than that of the finished particles. However, due care should be taken in not damaging the active by the heat. In this context an important feature is that the visco-elastic liquid matrix contains a low amount of water or no water, because the absence of water may make it possible to apply higher temperatures than if water was present without significantly damaging the active.

After preparing this mixture a number of different step can be applied to prepare liquid particles from the dispersion.

In one embodiment the dispersion is cooled to below the glass transition temperature of the visco-elastic liquid matrix and the dispersion is crushed and/or grinded to obtain small particles of the frozen liquid dispersion.

In another embodiment the dispersion is processed while the visco-elastic liquid matrix is in its liquid state, at ambient temperature, by rolling the dispersion into a thin sheet of visco-elastic liquid material and cutting out pieces. This method resembles the way Italian pasta is made by preparing sheets of material and slicing pieces of a desired shape from the sheet.

In a third embodiment the dispersion is extruded through a small hole and the extrusion product is cut into small pieces.

The particles obtained in the above mentioned is particularly rounded to achieve spherical or near spherical shape of the particles. This can be done conventionally, such as in a Marumarizer. It is however preferred to use liquid nature of the particles to shape to particles. By fluidising the particles in a fluid bed dryer and subjecting the particles to heat the surface tension of the visco-elastic liquid matrix will cause the particles to adapt a spherical shape. This procedure also facilitates any subsequent coating step because application of the coating may be conducted after rounding of the particles, but while the particles are still fluidised. In a fluid bed coating process the fluidised core particles are sprayed with a solution containing the coating material(s), and the coating is deposited on the surface of the core particles by evaporating the solution solvent.

Compositions Comprising the Particle and their Application

The invention also relates to compositions comprising the particles of the invention. The composition may be any composition, but particular compositions are those intended for such in the food, baking and/or detergent industry. Accordingly the composition may be a food, bakers flour, dough or detergent composition or an additive to be incorporated in such compositions. Also the invention encompasses the use of the composition, e.g. for improving foodstuffs such as bread or for cleaning an object such as a cellulose containing fabric.

Baking

In a special embodiment of the invention we have found that our development of new particles comprising an active is useful in baking industry.

Within the flour mill and the baking industry the use of actives, such as enzymes, is well established. For incorporation of enzyme particles in flour compositions, however, the particle size should not exceed a particle size of 200 μm. Such small particles have conventionally only been available as spray dried products. However, conventional spray dried product are usually fragile agglomerates of very small particles and tend to release enzyme dust.

Our development of a new particle enables preparation of small enzyme containing particles having a very low dust release due the visco-elastic liquid matrix in which the enzyme is embedded. Accordingly the invention provides baking compositions comprising the particles of the invention, in particular dough improver compositions or flour compositions comprising the dough improver.

When using enzymes in the baking industry certain enzyme activities are preferred. Flour has varying content of amylases leading to differences in the baking quality. Addition of amylases can be necessary in order to standardize the flour. Amylases and pentosanases generally provide sugar for the yeast fermentation, improve the bread volume, retard retrogradation, and decrease the staling rate and stickiness that results from pentosan gums. Examples of carbohydrases are given below.

Certain maltogenic amylases can be used for prolonging the shelf life of bread for two or more days without causing gumminess in the product. Selectively modifies the gelatinized starch by cleaving from the non-reducing end of the starch molecules, low molecular weight sugars and dextrins. The starch is modified in such a way that retrogradation is less likely to occur. The produced low-molecular-weight sugars improve the baked goods water retention capacity without creating the intermediate-length dextrins that result in gumminess in the finished product. The enzyme is inactivated during bread baking, so it can be considered a processing aid, which does not have to be declared on the label.

The bread volume can be improved by fungal alpha-amylases, which further provide good and uniform structure of the bread crumb.

Said alpha-amylases are endoenzymes that produce maltose, dextrins and glucose. Cereal and some bacterial alpha-amylases are inactivated at temperatures above the gelatinization temperature of starch, therefore when added to a wheat dough it results in a low bread volume and a sticky bread interior. Fungamyl has the advantage of being thermolabile and is inactivated just below the gelatinization temperature.

Enzyme preparations containing a number of pentosanase and hemi-cellulase activities can improve the handling and stability of the dough, and improves the freshness, the crumb structure and the volume of the bread.

By hydrolysing the pentosans fraction in flour, it will lose a great deal of its water-binding capacity, and the water will then be available for starch and gluten. The gluten becomes more pliable and extensible, and the starch gelatinize more easily. Pentosanases can be used in combination with or as an alternative to emulsifiers.

Detergents

The particles if the invention may also particularly be added to and thus become a component of a detergent composition, in particular a granular detergent composition.

The detergent composition of the invention may for example be formulated as laundry detergent composition for hand or machine washings including a cleaning additive composition suitable for pre-treatment of stained fabrics or a fabric softener composition, or a detergent composition for use in general household hard surface cleaning operations, or a composition for hand or machine dishwashing operations.

In a specific aspect, the invention provides a detergent additive comprising the particles of the invention. The detergent additive as well as the detergent composition may comprise one or more other enzymes such as a protease, a lipase, a cutinase, an amylase, a carbohydrase, a cellulase, a pectinase, a mannanase, an arabinase, a galactanase, a xylanase, an oxidase, e.g., a laccase, and/or a peroxidase.

In general the properties of the chosen enzyme(s) should be compatible with the selected detergent, (i.e. pH-optimum, compatibility with other enzymatic and non-enzymatic ingredients, etc.), and the enzyme(s) should be present in effective amounts.

Proteases: Suitable proteases include those of animal, vegetable or microbial origin. Microbial origin is preferred. Chemically modified or protein engineered mutants are included. The protease may be a serine protease or a metallo protease, particularly an alkaline microbial protease or a trypsin-like protease. Examples of alkaline proteases are subtilisins, especially those derived from Bacillus, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270 and WO 94/25583.

Examples of useful proteases are the variants described in WO 92/19729, WO 98/20115, WO 98/20116, and WO 98/34946, especially the variants with substitutions in one or more of the following positions: 27, 36, 57, 76, 87, 97, 101, 104, 120, 123, 167, 170, 194, 206, 218, 222, 224, 235 and 274.

Particular commercially available protease enzymes include ALCALASE™, SAVINASE™, PRIMASE™, DURALASE™, ESPERASE™, and KANNASE™ (Novo Nordisk A/S), MAXATASE™, MAXACAL™, MAXAPEM™, PROPERASE™, PURAFECT™, PURAFECT OXP™, FN2™, and FN3™ (Genencor International Inc.).

Lipases: Suitable lipases include those of bacterial or fungal origin. Chemically modified or protein engineered mutants are included. Examples of useful lipases include lipases from Huimicola (synonym Thermomyces), e.g. from *H. lanuginosa* (*T. lanuginosus*) as described in EP 258 068 and EP 305 216 or from *H. insolens* as described in WO 96/13580, a Pseudomonas lipase, e.g. from *P. alcaligenes* or *P. pseudoalcaligenes* (EP 218 272), *P. cepacia* (EP 331 376), *P. stutzeri* (GB 1,372,034), *P. fluorescens*, Pseudomonas sp. strain SD 705 (WO 95/06720 and WO 96/27002), *P. wisconsinensis* (WO 96/12012), a Bacillus lipase, e.g. from *B. subtilis* (Dartois et al. (1993), Biochemica et Biophysica Acta, 1131, 253–360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202.

Particular commercially available lipase enzymes include LIPOLASE™ and LIPOLASE ULTRA™ (Novo Nordisk A/S).

Amylases: Suitable amylases (α and/or β) include those of bacterial or fungal origin. Chemically modified or protein engineered mutants are included. Amylases include, for example, α-amylases obtained from Bacillus, e.g. a special strain of *B. licheniformis,* described in more detail in GB 1,296,839.

Examples of useful amylases are the variants described in WO 94/02597, WO 94/18314, WO 96/23873, and WO 97/43424, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

Commercially available amylases are DURAMYL™, TERMAMYL™, FUNGAMYL™ and BAN™ (Novo Nordisk A/S), RAPIDASE™ and PURASTAR™ (from Genencor International Inc.).

Cellulases: Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acremonium, e.g. the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having color care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299.

Commercially available cellulases include CELLUZYME™, and CAREZYME™ (Novo Nordisk A/S), CLAZINASE™, and PURADAX HA™ (Genencor International Inc.), and KAC-500(B)™ (Kao Corporation).

Peroxidases/Oxidases: Suitable peroxidases/oxidases include those of plant, bacterial or fungal origin. Chemically modified or protein engineered mutants are included. Examples of useful peroxidases include peroxidases from Coprinus, e.g. from *C. cinereus,* and variants thereof as those described in WO 93/24618, WO 95/10602, and WO 98/15257.

Commercially available peroxidases include GUARDZYME™ (Novo Nordisk A/S).

The detergent enzyme(s) may be included in a detergent composition by adding separate additives containing one or more enzymes, or by adding a combined additive comprising all of these enzymes. A detergent additive of the invention, i.e. a separate additive or a combined additive, may be formulated so as to contain one or more of the particles of the invention comprising different enzymes.

A dry particulate detergent composition of the invention may be in any convenient form, e.g., a bar, a tablet, a powder, a granule or a paste. The detergent composition may also be a liquid, in particular a non-aqueous liquid detergent.

The detergent composition comprises one or more surfactants, which may be non-ionic including semi-polar and/or anionic and/or cationic and/or zwitterionic. The surfactants are typically present at a level of from 0.1% to 60% by weight.

When included therein the detergent will usually contain from about 1% to about 40% of an anionic surfactant such as linear alkylbenzenesulfonate, alpha-olefinsulfonate, alkyl sulfate (fatty alcohol sulfate), alcohol ethoxysulfate, secondary alkanesulfonate, alpha-sulfo fatty acid methyl ester, alkyl- or alkenylsuccinic acid or soap.

When included therein the detergent will usually contain from about 0.2% to about 40% of a non-ionic surfactant such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

The detergent may contain 0–65% of a detergent builder or complexing agent such as zeolite, diphosphate, triphosphate, phosphonate, carbonate, citrate, nitrilotriacetic acid, ethylenediaminetetraacetic acid, diethylenetriaminepentaacetic acid, alkyl- or alkenylsuccinic acid, soluble silicates or layered silicates (e.g. SKS-6 from Hoechst).

The detergent may comprise one or more polymers. Examples are carboxymethylcellulose, poly (vinylpyrrolidone), poly(ethylene glycol), poly(vinyl alcohol), poly(vinylpyridine-N-oxide), poly (vinylimidazole), polycarboxylates such as polyacrylates, maleic/acrylic acid copolymers and lauryl methacrylate/acrylic acid copolymers.

The detergent may contain a bleaching system, which may comprise a $H_2O_2$ source such as perborate or percarbonate, which may be combined with a peracid-forming bleach activator such as tetraacetylethylenediamine or nonanoyloxybenzenesulfonate. Alternatively, the bleaching system may comprise peroxyacids of e.g. the amide, imide, or sulfone type.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The detergent may also contain other conventional detergent ingredients such as e.g. fabric conditioners including clays, foam boosters, suds suppressors, anti-corrosion agents, soil-suspending agents, anti-soil redeposition agents, dyes, bactericides, optical brighteners, hydrotropes, tarnish inhibitors, or perfumes.

It is at present contemplated that in the detergent compositions any enzyme, may be added in an amount corresponding to 0.01–100 mg of enzyme protein per liter of wash liquor, particularly 0.05–5 mg of enzyme protein per liter of wash liquor, in particular 0.1–1 mg of enzyme protein per liter of wash liquor.

The enzyme of the invention may additionally be incorporated in the detergent formulations disclosed in WO 97/07202, which is hereby incorporated as reference.

EXAMPLES

Example 1

Preparation of Visco-elastic Matrix

This example shows the general procedure for the manufacture of a typical visco-elastic matrix. The amounts of ingredients may be varied in a large interval to vary the final rheological properties within a large range of visco-elastic parameters. The amount of whipping agent is an important factor in controlling the aeration of the final product and thus controlling both the density and the elastic properties.

| Order of addition | Ingredients | Kg or liter | % soluble solids |
|---|---|---|---|
| A) | Water | 11.0 | — |
|  | GENUTINE ™ type X-9303 | 0.15 | 100 |
|  | Agar (2) | 0.07 | 100 |
|  | Sugar | 5.50 | 100 |
| B) | Sugar | 33.00 | 100 |
|  | Glucose syrup (DE-42) | 49.50 | 84 |
|  | Fat, hydrogenated (MP 32° C.) | 5.50 |  |
|  | Lecithin | 0.06 |  |
| C) | Whipping agent (1) | 0.33 | 100 |
|  | Icing sugar | 7.70 | 100 |
|  | Glucose syrup (DE-42) | 1.10 | 84 |
|  | Water | 5.50 | — |

(1) Whipping agent: Hyfoama DSN, Quest
(2) Agar: Algamar Agar type HS, Algas Marinas S.A. Santiago, Chile Process
1. Premix whipping agent and icing sugar(C).
2. Dissolve water and glucose syrup (C) by gentle heating and stirring. Allow cooling before adding to premix (point 1) and whip to very stiff foam in an open mixer.
3. Measure water (A) into boiling equipment.
4. Premix sugar, GENUTINE™ (A), and agar. Disperse in the water and dissolve by boiling for 2 min.
The following is then added:
5. Add the sugar (B) gradually while stirring and dissolve by boiling.
6. Add the glucose syrup (B) while boiling.
7. Add the melted fat (B) while stirring.
8. Add lecithin (B) while stirring.
9. Stir continuously and boil until 127° C.
10. Add the whipped foam from (2) to the sugar slurry (9) while stirring slowly.
11. Place the batch on a cooling table, and allow cooling. The batch needs to be turned and folded from time to time.
12. Pull the batch for 3–5 minutes to mix in air to reduce density and to improve the rheological properties of the matrix.
13. The batch has to be cooled down to a suitable temperature selected according to the requirements of the active material to be incorporated into the matrix.

The visco-elastic properties were characterised in a Bholin Rheometer using a strain sweep method. The measuring system was serrated plates SP 5/30 and the temperature was controlled at a temperature of 40° C. The strain interval was 0.0002–0.16. Following results were obtained:

$\eta' = 6.20 \cdot 10^3 - 2.11 \cdot 10^3$ Pa
$\eta'' = 2.14 \cdot 10^4 - 1.32 \cdot 10^4$ Pa
$\phi = 73.0 - 80.9°$ (degrees, phase angle)

In the example above we have aimed at putting major emphasis on the liquid properties and the phase angle turned out to be about 70–80°. This may, however, easily be changed by the formulation so that we may design the mechanical properties to our needs, which could be high impact resistance enzyme granules. Such granules would release no or hardly measurable amounts of active material during handling, mixing into detergents etc.

Example 2

Preparation of Enzyme Granules Using a Visco-elastic Matrix

The visco-elastic matrix prepared above may be used for the preparation of enzyme granules by applying different mechanical forming processes well known in the art of preparing confectionery products. In this example a single screw extruder was used to mix spray dried enzyme powder into the matrix by:

1) Heating 500 g of matrix to a temperature of 450° C. in a microwave oven.
2) Adding 50 g of spray dried Savinase© enzyme powder with an activity of 99.8 KNPU(S)/g when feeding the matrix into the extruder.
3) The extrudates are returned into the extruder a number of times to get a complete uniform product.

The last time the product is extruded the extrudates are cut into particles by a knife when they leave the extruder, which a well known technology in the art. The particle size is controlled by the speed of the knife.

What is claimed is:

1. A particle comprising an active dispersed in a visco-elastic liquid matrix, wherein the visco-elastic parameters $\eta'$ and $\eta''$ are between $10^3$ to $10^{14}$ Pa measured in a cone-and-plate rheometer at 25° C. and a sinusoidal frequency, $\omega$, of 1 Hz.

2. The particle of claim 1, wherein the visco-elastic parameters $\eta'$ and $\eta''$ are between $10^8$ to $10^{12}$ Pa.

3. The particle of claim 2, wherein the visco-elastic parameters $\eta'$ and $\eta''$ are between $10^9$ to $10^{11}$ Pa.

4. The particle of claim 1, wherein the visco-elastic parameters $\eta'$ and $\eta''$ are between $10^4$ to $10^{11}$ Pa.

5. The particle of claim 1, wherein a majority of the components constituting the visco-elastic liquid matrix are water soluble.

6. The particle of claim 1, wherein the visco-elastic liquid matrix is selected from liquid organic polymers and monomers.

7. The particle of claim 6, wherein the visco-elastic liquid matrix is selected from carbohydrate polymers, proteins, sugars, glucose syrups, modified vegetable oils or mixtures thereof.

8. The particle of claim 1, wherein the active is an enzyme.

9. The particle of claim 1, further comprising a compound selected from binders, enzyme stabilising agents, solubilising agents, inorganics, waxes, fiber materials, cross-linking agents, suspension agents, mediators and viscosity regulating agents.

10. The particle of claim 1, which has a size between 50 and 500 µm.

11. The particle of claim 1, further comprising a solid coating.

12. The particle of claim 11, wherein the ratio between the diameter of the coated particle and the diameter of the core particle is at least 1.1.

13. The particle of claim 12, wherein the thickness of the coating is at least 25 µm.

14. A composition comprising the particle of claim 1.

15. The composition of claim 14, which is a dry particulate detergent composition further comprising a surfactant.

16. The composition of claim 14, which is a dough composition further comprising a flour.

17. A method for preparing the particle of claim 1, comprising preparing a homogeneous dispersion of active in a visco-elastic liquid.

18. The method of claim 17, further comprising one or more of the following steps:

(a) cooling the dispersion to below the glass transition temperature and crushing or grinding the frozen dispersion into particles, (b) rolling the dispersion into a thin visco-elastic liquid sheet and cutting out pieces of the sheet, and (c) extruding the dispersion and cutting extrusion product into small pieces.

19. The method of claim 18, further comprising one or more of the following steps:

(a) rounding the particles in a marumarizer, and (b) rounding the particles by fluidising the particles in a fluid bed dryer.

20. The method of claim 19, further comprising coating the particles by fluidising the particles and depositing a coating material on the surface of the particles.

* * * * *